(12) United States Patent
Van Camp et al.

(10) Patent No.: US 8,557,174 B2
(45) Date of Patent: Oct. 15, 2013

(54) PROCESS AND APPARATUS FOR RECOVERY OF NON-FERROUS METALS FROM ZINC RESIDUES

(75) Inventors: Maurits Van Camp, Mortsel (BE);
Jonathan Aerts, Turnhout (BE);
Benedict Janssens, Herentals (BE);
Sven Santen, Hofors (SE)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 12/880,693

(22) Filed: Sep. 13, 2010

(65) Prior Publication Data
US 2011/0042868 A1 Feb. 24, 2011

Related U.S. Application Data

(62) Division of application No. 10/573,681, filed as application No. PCT/EP2004/009685 on Aug. 30, 2004, now Pat. No. 7,815,708.

(60) Provisional application No. 60/511,200, filed on Oct. 16, 2003.

(30) Foreign Application Priority Data

Sep. 29, 2003 (EP) ..................... 03078038

(51) Int. Cl.
*H05H 1/26* (2006.01)
*F27B 3/20* (2006.01)

(52) U.S. Cl.
USPC ............. 266/218; 266/241; 266/265; 373/22; 373/24; 373/76

(58) Field of Classification Search
USPC ................. 373/22, 24, 76; 266/265, 218, 241
See application file for complete search history.

(56) References Cited

U.S. PATENT DOCUMENTS 2,836,487 A 5/1958 Fastje et al.
(Continued)

FOREIGN PATENT DOCUMENTS

GB 2094772 9/1982
JP 53070005 6/1978
(Continued)

OTHER PUBLICATIONS

Barnhart, ed. American College Dictionary, New York, NY, (1970), p. 1342.
(Continued)

*Primary Examiner* — George Wyszomierski
*Assistant Examiner* — Tima M McGuthry Banks
(74) *Attorney, Agent, or Firm* — Brinks Hofer Gilson & Lione

(57) ABSTRACT

The invention relates to a process for the separation and recovery of non-ferrous metals from zinc-bearing residues, in particular from residues produced by the zinc manufacturing industry. The process comprises the steps of:—subjecting the residue to a flash or agitated bath fuming step, thereby producing an Fe bearing slag and Zn- and Pb-bearing fumes; and—extracting the Zn- and Pb-bearing fumes and valorizing Zn and Pb; characterized in that CaO, $SiO_2$ and MgO are added as a flux before or during the fuming step so as to obtain a final slag composition with: formula (I) all concentrations being expressed in wt %. The invention also relates to a single-chamber reactor for Zn-fuming equipped with one or more submerged plasma torches as heat and gas sources.

$$\frac{[Fe]}{[SiO_2]} + \frac{[CaO]}{[SiO_2]} + \frac{[MgO]}{3} > 3.5; \quad (I)$$

$$0.1 < \frac{[CaO]}{[SiO_2]} < 1.3; \text{ and}$$

$$6 < [SiO_2] < 22$$

3 Claims, 2 Drawing Sheets

(56) References Cited

U.S. PATENT DOCUMENTS

| | | | |
|---|---|---|---|
| 2,932,566 A | 4/1960 | Lumsden | |
| 3,721,547 A | 3/1973 | Dvorak | |
| 3,756,804 A | 9/1973 | Stevenson | |
| 3,830,639 A | 8/1974 | Evans et al. | |
| 4,072,503 A | 2/1978 | Petterson et al. | |
| 4,248,624 A | 2/1981 | Novoa et al. | |
| 4,415,356 A | 11/1983 | Victorovich et al. | |
| 4,415,540 A | 11/1983 | Wilkomirsky et al. | |
| 4,514,219 A * | 4/1985 | de Saint Martin | 75/10.22 |
| 4,519,836 A | 5/1985 | Sychev et al. | |
| 4,521,245 A | 6/1985 | Yarygin et al. | |
| 4,571,260 A | 2/1986 | Johansson et al. | |
| 5,199,974 A | 4/1993 | Fugleberg | |
| 5,256,186 A | 10/1993 | Player et al. | |
| 5,282,881 A | 2/1994 | Baldock et al. | |
| 5,372,630 A * | 12/1994 | Foo et al. | 75/654 |
| 5,910,382 A | 6/1999 | Goodenough et al. | |
| 5,922,261 A | 7/1999 | Ford, Jr. | |
| 5,942,023 A | 8/1999 | Bitler et al. | |
| 6,379,421 B1 | 4/2002 | Salinas-Fernandez et al. | |
| 6,749,967 B2 | 6/2004 | Li et al. | |
| 7,390,472 B1 | 6/2008 | Singhal et al. | |
| 7,597,740 B2 | 10/2009 | Van Camp et al. | |
| 7,771,628 B2 | 8/2010 | Barker et al. | |
| 2002/0192137 A1 | 12/2002 | Chaloner-Gill et al. | |
| 2002/0192476 A1 | 12/2002 | Kambe et al. | |
| 2003/0215718 A1 | 11/2003 | Huang et al. | |
| 2004/0033360 A1 | 2/2004 | Armand et al. | |
| 2004/0151649 A1 | 8/2004 | Hemmer et al. | |
| 2004/0175614 A1 | 9/2004 | Wurm et al. | |
| 2004/0197654 A1 | 10/2004 | Barker et al. | |
| 2006/0035148 A1 | 2/2006 | Balaya et al. | |
| 2006/0035150 A1 | 2/2006 | Audemer et al. | |
| 2007/0031732 A1 | 2/2007 | Chiang et al. | |
| 2008/0241690 A1 | 10/2008 | Delacourt et al. | |
| 2010/0086852 A1 | 4/2010 | Gibot et al. | |

FOREIGN PATENT DOCUMENTS

| | | | |
|---|---|---|---|
| JP | 2004079276 | | 3/2004 |
| JP | 2004259470 | | 9/2004 |
| KR | 20010082743 | * | 8/2001 |
| SU | 1048810 | | 7/1989 |
| WO | WO 9836102 | | 8/1998 |
| WO | WO 02083555 | | 10/2002 |
| WO | WO 02099913 | | 12/2002 |
| WO | WO 04001881 | | 12/2003 |
| WO | WO 2004056702 | | 7/2004 |
| WO | WO 2005051840 | | 6/2005 |
| WO | WO 2006105848 | | 10/2006 |
| WO | WO 2007000251 | | 1/2007 |
| WO | WO 2008018633 | | 2/2008 |
| WO | WO 2008077447 | | 7/2008 |
| WO | WO 2008077448 | | 7/2008 |
| WO | WO 2008113570 | | 9/2008 |

OTHER PUBLICATIONS

De Schepper, "Liquid-Liquid Extraction of Germanium by LIX-63," Database Compendex, Database Accession No. EIX78110005759, Sep. 26, 1977. (XP- 002260042) Abstract.

Esna-Ashari et al., "Smelting Reactor for Recovering Zinc from Industrial Low Zinc Bearing Residues," Erzmetall, Reiderer Verlag GmbH, Stuttgart, Germany, vol. 53, No. 6, (2000), pp. 373-384. (XP 000959985).

Heard et al., "Recycling of Zinc-Bearing Residues with the PRIMUS Process," Iron Steelmaker I and SM, vol. 30, No. 5, (Apr. 2003), pp. 55-60. (XP 009020220).

International Preliminary Report on Patentability, issued in commonly owned International Application No. PCT/EP2004/006238, dated Oct. 7, 2005.

International Preliminary Report on Patentability, issued in corresponding International Application No. PCT/EP2004/009685, dated Jan. 12, 2006.

International Search Report and Written Opinion, issued in commonly owned International Application No. PCT/EP2004/006238, dated Sep. 23, 2004.

International Search Report and Written Opinion, issued in corresponding International Application No. PCT/EP2004/009685, dated Jan. 21, 2005.

Jak et al., "Phase Equilibria and Thermodynamics of Zinc Fuming Slags," Canadian Metallurgical Quarterly, vol. 41, No. 2, (2002), pp. 163-174.

XP-002310971 "Extn. of Valuable Components for Metallurgical Slags—by Treatment of Slag Stream with Hot Neutral or Reducing Gas Heated in Arc Plasmatron," Derwent Publications Ltd., Section Ch, Week 198223, Aug. 15, 1981. Abstract.

Amine et al., "Olivine $LiCoPO_4$ as 4.8 V Electrode Material for Lithium Batteries," Electrochemical and Solid-State Letters, vol. 3, No. 4, (2000), pp. 178-179.

Arnold et al., "Fine-Particle Lithium Iron Phosphate LiFePO4 Synthesized by a New Low-Cost Aqueous Precipitation Technique," Journal of Power Sources, vol. 119-121, (2003), pp. 247-251.

Arumugan et al., "Synthesis and Electrochemical Characterizations of Nano-Crystalline LiFePO4 and Mg-Doped LiFePO4 Cathode Materials for Rechargeable Lithium-Ion Batteries," J Solid State Electrochem, vol. 13, (2009), pp. 301-307.

Chen et al., "Reducing Carbon in $LiFePO_4$/C Composite Electrodes to Maximize Specific Energy, Volumetric Energy, and Tap Density," Journal of The Electrochemical Society, vol. 149, No. 9, (2002), pp. A1184-A1189.

Delacourt et al., "Low Temperature Preparation of Optimized Phosphates for Li-Battery Applications," Solid State Ionics, vol. 173, (2004), pp. 113-118.

Delacourt et al., "One-Step Low-Temperature Route for the Preparation of Electrochemically Active $LiMnPO_4$ Powders," Chem. Mater., vol. 16, (2004), pp. 93-99.

Delacourt et al., "The Existence of a Temperature-Driven Solid Solution in $Li_xFePO4$ for $0 \leq x \leq 1$," Nature Publishing Group, (2005), pp. 1-7.

Delacourt et al., "Toward Understanding of Electrical Limitations (Electronic, Ionic) in $LiMPO_4$ (M=Fe, Mn) Electrode Materials," Journal of the Electrochemical Society, vol. 152, No. 5, (2005), pp. A913-A921.

Dodd et al., "Phase Diagram of $Li_xFePO_4$," Electrochemical and Solid-State Letters, vol. 9, No. 3, (2006), pp. A151-A155.

Extended European Search Report, issued in EP06292048.3-1218, dated Apr. 25, 2007.

Extended European Search Report, issued in EP07290328.9-2119, dated Sep. 20, 2007.

Final Office Action, dated Sep. 3, 2010, issued in co-pending, commonly assigned U.S. Appl. No. 12/519,853.

Franger et al., "Comparison Between Different $LiFePO_4$ Synthesis Routes and Their Influence on its Physico-Chemical Properties," Journal of Power Sources, vol. 119-121, (2003), pp. 252-257.

International Preliminary Report on Patentability, issued in PCT/EP2007/009969, dated Jul. 2, 2009.

International Preliminary Report on Patentability, issued in PCT/EP2007/009968, dated Jul. 2, 2009.

International Preliminary Report on Patentability, issued in PCT/EP2008/002195, dated Jun. 23, 2009.

International Search Report, issued in PCT/EP2007/009968, dated Apr. 14, 2008.

International Search Report, issued in PCT/EP2007/009969, dated Mar. 26, 2008.

International Search Report, issued in PCT/EP2008/002195, dated Aug. 14, 2008.

Kwon et al., "Enhanced Electrochemical Performance of Mesoparticulate $LiMnPO_4$ for Lithium Ion Batteries," Electrochemical and Solid-State Letters, vol. 9, No. 6, (2006), pp. A277-A280.

Li et al., "$LiMnPO_4$ as the Cathode for Lithium Batteries," Electrochemical and Solid-State Letters, vol. 5, No. 6, (2002), pp. A135-A137.

Lloris et al., "Improvement of the Electrochemical Performance of $LiCoPO_4$ 5 V Material Using a Novel Synthesis Procedure," Electrochemical and Solid-State Letters, vol. 5, No. 10, (2002), A234-A237.

(56) References Cited

OTHER PUBLICATIONS

Ma et al., "Electrochemical Performance of Nanocrystalline $LiMPO_4$ Thin-Films Prepared by Electrostatic Spray Deposition," Journal of Power Sources, vol. 148, (2005), pp. 66-71.

Mi et al., "Synthesis and Performance of $LiMn_{0.6}Fe_{0.4}PO_4$/Nano-Carbon Webs Composite Cathode," Materials Science and Engineering B, vol. 129, (2006), pp. 8-13.

Nuspl et al., "Ultrafine $LiFePO_4$ Synthisized by an Optimized Hydrothermal Process," Abs. 293, IMLB 12 Meeting, (2004).

Office Action, dated Apr. 26, 2010, issued in co-pending, commonly assigned U.S. Appl. No. 12/519,853.

Office Action, dated Feb. 8, 2011, issued in co-pending, commonly assigned U.S. Appl. No. 12/519,853.

Office Action, dated Nov. 3, 2010, issued in co-pending, commonly assigned U.S. Appl. No. 12/825,682.

Okada et al., "Cathode Properties of Phospho-Olivine $LiMPO_4$ for Lithium Secondary Batteries," Journal of Power Sources, vol. 97-98, (2001), pp. 430-432.

Padhi et al., "Phospho-Olivines as Positive-Electrode Materials for Rechargeable Lithium Batteries," J. Electrochem. Soc., vol. 144, No. 4, (Apr. 1997), pp. 1188-1194.

Striebel et al., "Comparison of $LiFePO_4$ from Different Sources," Journal of The Electrochemical Society, vol. 152, No. 4, (2005), pp. A664-A670.

Wang et al., "Extraction of Layerwise Conductivities Carbon-Enhanced, Multilayered $LiFePO_4$ Cathodes," Journal of The Electrochemical Society, vol. 152, No. 5, (2005), pp. A1001-A1010.

Yamada et al., "Phase Change in $Li_xFePO_4$," Electrochemical and Solid-State Letters, vol. 8, No. 8, (2005), pp. A409-A413.

Yonemura et al., "Comparative Kinetic Study of Olivine $Li_xMPO_4$ (M=Fe, Mn)," Journal of The Electrochemical Society, vol. 151, No. 9, (2004), pp. A1352-A1356.

\* cited by examiner

PROCESS AND APPARATUS FOR RECOVERY OF NON-FERROUS METALS FROM ZINC RESIDUES

This application is a divisional of U.S. patent application Ser. No. 10/573,681, filed Mar. 23, 2006, which issued as U.S. Pat. No. 7,815,708 and which is a National Stage application of International Application No. PCT/EP2004/009685, filed Aug. 30, 2004, which claims the benefit of U.S. Provisional Application No. 60/511,200 filed Oct. 16, 2003, and which claims priority to EP 03078038.1, filed Sep. 29, 2003, the entire contents of which applications are hereby incorporated herein by reference in their entirety.

FIELD OF THE INVENTION

This invention relates to the recovery of non-ferrous metals from zinc-bearing residues, in particular from residues produced by the zinc manufacturing industry.

BACKGROUND

Blende, which is an impure ZnS ore, is the main starting material for the production of Zn. The typical industrial practice encompasses an oxidative roasting step, producing ZnO together with sulphates or oxides of the impurities. In subsequent steps, the ZnO in roasted blende is brought into solution by leaching in neutral conditions or in weak acidic conditions, thereby producing Zn-depleted residues, respectively referred to in this description as neutral leach residue and as weak acid leach residue. However, during roasting, part of the Zn reacts with Fe, a typical impurity present in blende, and forms relatively insoluble zinc ferrite. The leach residues therefore contain, besides lead sulphate, calcium sulphate and other impurities, a sizeable fraction of Zn in the form of ferrite. According to present practice, the recovery of the Zn from ferrite requires a specific hydro-metallurgical residue treatment using high acid concentrations of 50 to 200 g/l $H_2SO_4$. A disadvantage of this acidic treatment is that besides Zn, almost all the Fe and also other impurities such as As, Cu, Cd, Ni, Co, Tl, Sb are dissolved. As even low concentrations of these elements interfere with the subsequent electrowinning of Zn, they must be removed from the zinc sulphate solution. While Cu, Cd, Co, Ni and Tl are precipitated by addition of Zn powder, Fe is typically discarded as hematite, jarosite or goethite through hydrolysis. Due to the danger of washout of heavy metals, these Fe-bearing residues have to be disposed off in a well-controlled landfill. Landfilling of such residues has however come under heavy environmental pressure, rendering the sustainability of the process questionable. Another drawback of the above treatment is the loss of metals such as In, Ge, Ag and Zn in the Fe-bearing residue.

An alternative treatment of the ferrite-bearing residues is applied in some plants, using Waelz kilns, which produce a slag, and a Zn and Pb containing fume. Similarly, a rotary flame-fired furnace of the Dorschel type can be used in a batch process. In still another approach, the leach residue is processed, using coke as fuel, in a half shaft blast furnace, producing a Zn and Pb containing fume, matte and slag. These pyro-metallurgical treatments generally result in an excellent recovery of Zn and Pb, and, for some of them, in a significant recovery of Ag, Ge and In.

These processes are however inadequate for modern zinc smelters, as they cannot be scaled up to large single-vessel operations. By this fact, they are not a cost efficient solution for today's Zn smelters.

In U.S. Pat. No. 2,932,566 oxidic zinciferous material is smelted with coke in a blast furnace and Zn is recovered from the furnace gases. In an example, fluxes are added to obtain a final slag with 61% FeO, 16% $SiO_2$, 11.5% CaO and 3% $Al_2O_3$. In U.S. Pat. No. 4,072,503 Zn-, Fe- and Pb-bearing residues are fumed in a DC arc furnace, obtaining in one example a final slag with 43% FeO, 24% $SiO_2$, 13% CaO, 6% MgO and 5% $Al_2O_3$. The smelting processes in above mentioned prior art documents take place in a packed bed or a still bath configuration, and not in an agitated bath or flash smelter at temperatures around 1300° C.

Recent literature mentions high temperature treatment of Zn-containing Fe-based secondary residues, such as EAF dusts. These temperatures are indeed needed to ensure a high Zn-fuming rate, down to low Zn content in the slag, in one single operation. In a known bath or flash smelting processes, the hitherto commonly used fayalite type of slag ($2FeO.SiO_2$) is heated to well above its melting point (of about 1100° C.) during the metallurgical operation. Such strong superheating of the slag significantly shortens the lifetime of the refractory lining of the vessel. Using a water-cooled lining counters this effect, but at the prize of greatly increased heat losses. The batchwise operations in these smelters are therefore intentionally operated at low temperatures in order to preserve the bath lining and to limit the energy consumption; this however results in a discontinuous and slow fuming.

The primary aim of the invention is to provide a process for high-rate Zn-fuming, avoiding the corrosion of the vessel lining and limiting heat losses to a reasonable value.

DETAILED DESCRIPTION

To this end, a process is described, which combines forced agitation with a specially formulated freeze-lining slag. By agitation it is understood that, whether in the gas phase or in the liquid phase, the reacting compounds are forcefully intermixed with means that go beyond natural convection, such as e.g. with lances, tuyeres, plasma torches or other high momentum injection techniques.

Another object of the invention concerns a so-called submerged plasma torch furnace, which is particularly suitable for implementing the invented Zn-fuming process.

The invented process for the valorisation of metal values in a Zn-, Fe- and Pb-bearing residue, comprises the steps of:
  subjecting the residue to a flash or agitated bath fuming step, thereby producing an Fe-bearing slag and Zn- and Pb-bearing fumes; and
  extracting the Zn- and Pb-bearing fumes and valorising Zn and Pb; characterised in that CaO, $SiO_2$ and MgO are added as a flux before or during the fuming step so as to obtain a final slag composition with:

$$\frac{[Fe]}{[SiO_2]} + \frac{[CaO]}{[SiO_2]} + \frac{[MgO]}{3} > 3.5;$$

$$0.1 < \frac{[CaO]}{[SiO_2]} < 1.3; \text{ and}$$

$$6 < [SiO_2] < 22,$$

all concentrations being expressed in wt %.

By combining the use of agitated bath or flash smelting processes with especially adapted freeze-lining slag compositions, which do not need superheating at the process temperature, a rapid fuming process is obtained that can be run continuously. The slag readily forms a protective crust on the refractory lining of the vessel, thereby providing adequate thermal insulation. Also, the yield of the invented process is highly increased compared to prior art processes. The process is particularly suited for treating neutral leach residue or weak acid leach residue.

Dolomite and/or limestone are advantageously used as the sole sources for flux additions. The concentration of MgO in the final slag is preferably less than 5 wt %.

If Cu is present, a matte or alloy phase is produced in the fuming step, which contains a significant part of the Cu and a significant part of the precious metals. The term significant is, in this context, to be understood as corresponding to a recovery of at least 30 wt. % of the individual metals.

If Ge is present, the major part of it is fumed together with Zn and Pb. It can then be separated from the fumes, e.g. by co-precipitation with Fe hydroxide or by addition of tannic acid. Other useful separation techniques are solvent extraction and the use of ion-exchange resins.

Figure 2:
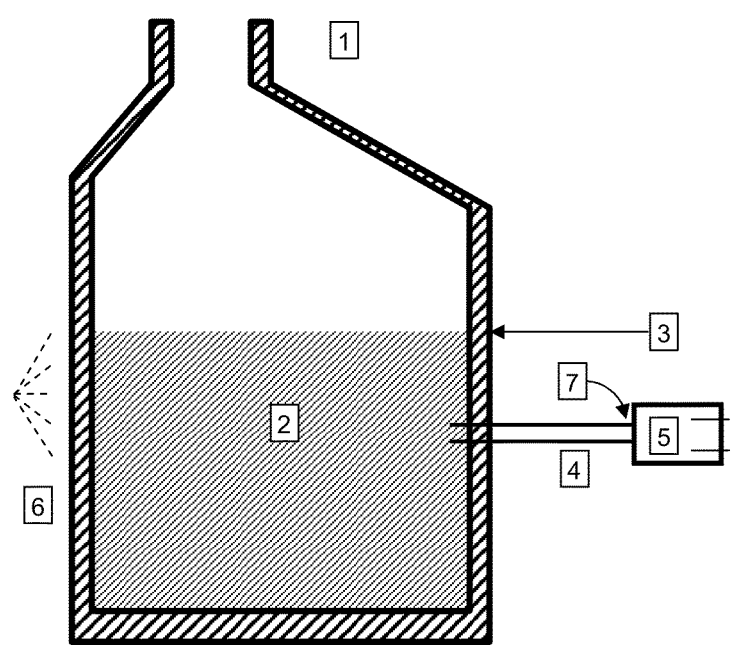
FIG. 2 is a schematic representation of a single chamber reactor in accordance with an embodiment of the present invention.

The fuming process can be performed in reactors such as a plasma flash furnace and a submerged lance furnace. FIG. 2 provides a schematic illustration of a single chamber reactor in accordance with an embodiment of the present invention. A single-chamber submerged plasma reactor 1 comprising a plasma fired tuyere 4 attached at a connection point 7 to a plasma torch 5 as heat, gas and momentum source, the tuyere 4 being arranged such that the plasma is generated under the surface 3 of the molten slag phase 2, constitutes a novel concept in the art of Zn-fuming, and is particularly well suited for implementing the invented process, because of the high energy production coupled to a small quantity of generated gases. This reactor can be equipped with water-cooled peripheral walls 6, and can be operated in a continuous manner.

The details of the invention are now discussed.

The fuming step consists in the reduction-smelting of the residue, whereby reductants such as natural gas, LPG, coal or cokes, and possibly fluxes such as limestone ($CaCO_3$) dolomite ($MgCO_3$, $CaCO_3$) and silica ($SiO_2$) are added to produce a fast fuming slag with a high melting point. This high melting point corresponds to limited superheating of the slag. This greatly facilitates freeze-lining, i.e. the formation of a crust on the inner surface of the cooled vessel walls. Limited superheating results in the formation of a relatively stable and thick crust, ensuring good thermal insulation and efficiently protecting the vessel lining from corrosion. Heat losses towards the cooled walls are thus greatly reduced. Moreover, the relatively low silica content of the slag appears to enhance the fuming rate. A slag melting point of at least 1250° C., and preferably of at least 1300° C. is recommended.

Figure 1:
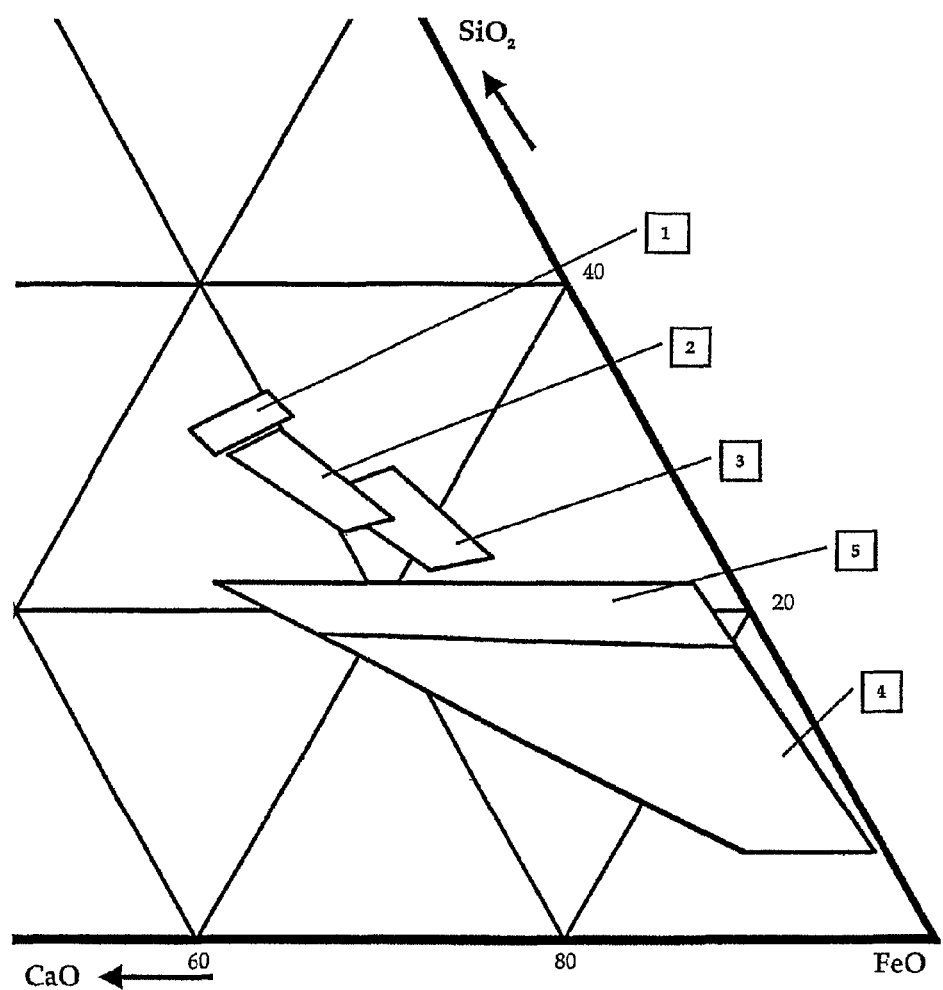
FIG. 1 is a ternary CaO—FeO—$SiO_2$ phase diagram illustrating slag compositions.

FIG. 1 illustrates slag compositions on a ternary CaO—FeO—$SiO_2$ phase diagram. Representative prior art fayalite slags are shown as areas under references 1, 2 and 3. See "Phase Equilibria and Thermodynamics of Zinc Fuming Slags", E. Jak and P. Hayes, Canadian Metallurgical Quarterly, vol 41, No 2, pp 163-174, 2002. The slag composition according to this invention are shown as areas under reference 4 (for 0 wt % MgO) and references 4+5 (for 5 wt. % MgO).

In most cases, the Zn-bearing residue can be fluxed according to the above criteria using limestone and/or dolomite only. Minimising the addition of silica results in a slag having the required high melting point and a fast fuming kinetics. The effect of MgO is to further increase the melting point of the slag. Due to its relatively high cost, it recommended to limit the concentration of MgO in the final slag to 5 wt. %.

In the fuming process, Zn and Pb are concentrated in the fumes. Cu is collected in a separate matte phase. Through leaching of these fumes, Zn and Pb can be separated in a Pb-containing residue and a Zn-containing leaching liquor. If the Zn-, Fe- and Pb-bearing residue also contains Ge, the Ge present in the fumes may be separated and treated batch-wise in a subsequent, Ge-rich fuming campaign. The Ge separation from the fumes is preferably performed by leaching, followed by co-precipitation with Fe hydroxide or by addition of tannic acid. The same principles apply for In.

The reactor types mentioned before lend themselves to large-scale, single-vessel operations. The overall process is compact, uses a single smelting/fuming reactor at high temperature and ensures a high metal value recovery while producing environmentally acceptable end products. The invention thus provides for an essentially waste-free process, which can compete economically with hydro-metallurgical Zn residue treatments. The slag is an environmentally acceptable output for Fe, which can be upgraded as gravel substitute in concrete. The actual valorisation of metallic Fe is unimportant due to its relatively low concentration in the contemplated residues and to its rather low intrinsic value.

A single-chamber reactor equipped with submerged plasma fired tuyeres has been specially designed for use in the above-described process. During start-up, the reactor is filled with slag, which is molten down by the plasma tuyeres until these are submerged. Then, a Zn-bearing residue is added, without the need for any special feed preparation, like drying or comminuting. The energy provided by the plasma tuyeres results in the melting of the feed and in the fuming of valuable metals like Zn, Pb, Ge and In. The reductants can be fed through the tuyeres (natural gas, LPG) or added to the feed (coal, cokes). The tuyeres are preferably submerged at a depth allowing them to contact the slag phase only, as the slag has a lower corrosive nature than the heavier other phases.

The use of the invented slag composition is preferably combined with water-cooling of the reactor's periphery: water-cooling of the side walls facilitates freeze-lining, which has, as explained above, a particularly advantageous effect.

Advantages of this furnace over the submerged lance furnace mainly stem from the use of electricity as a heat source. The submerged plasma reactor indeed achieves high flexibility through its ability to operate in a wide range of oxygen potentials, while minimising the total amount of off-gasses produced. Reduced off-gas amounts allow for a compact installation, operating with low emission of environmentally harmful gasses such as $CO_2$. Unlike a plasma flash furnace, where the molten phases settle without any agitation, the submerged plasma induces a suitable level of bath agitation, which lead to greatly accelerated reduction kinetics and which allows humid or wet materials to be directly fed into the furnace.

The following example illustrates the separation of different non-ferrous metals contained in a roasted and subsequently leached blende residue.

1500 kg of weak acid leach residue, which mainly consists of zinc ferrite ($ZnO.Fe_2O_3$), lead sulphate ($PbSO_4$), calcium sulphate ($CaSO_4$), zinc sulphate ($ZnSO_4$) and impurities like CaO, $SiO_2$, MgO, $Al_2O_3$, Ag, Cu and Ge, are dried and thoroughly mixed with 150 kg of cokes, having a purity of more than 85% C. The feed is fluxed with 90 kg of dolomite and 60 kg of limestone.

The mixture is then injected through a tuyere attached to a 1 MW air plasma torch for flash fuming at a feed rate of 12 kg/min. The furnace walls are water-cooled and protected by a thin layer of refractory at start-up. After two hours of smelting, the slag is tapped. The recovered fumes are rich in Zn and Pb, which are present as ZnO, PbO and/or $PbSO_4$.

The slag is tapped at 1325° C. with only limited superheating thanks to the fluxing of the feed resulting in a final slag composition according to the invention. Next to the slag and fumes, a separate Cu containing matte was tapped.

The analysis of the different feeds and productions is given in Table 1, together with the metal distribution across phases. "Others" refers to impurities and to bound elements such as oxygen. For the cokes, "Others" refers to ash content; for the fluxes, to impurities such as $Al_2O_3$.

TABLE 1

Material balance and metal distribution across phases

Feed to fuming furnace

| Component | Mass (kg) | Composition (wt. %) | | | | | | | | | | | |
|---|---|---|---|---|---|---|---|---|---|---|---|---|---|
| | | Ag | Pb | Cu | Zn | Fe | CaO | SiO$_2$ | MgO | S | Ge | C | Others |
| Residue | 1200 | 0.06 | 4.72 | 2.40 | 23.8 | 19.0 | 2.98 | 7.15 | 0.71 | 5.90 | .008 | | 33.3 |
| Limestone | 60 | 0.00 | 0.12 | 0.10 | | 3.00 | 50.4 | 6.10 | 0.46 | | | 10.9 | 28.9 |
| Dolomite | 90 | | 0.00 | 0.00 | 0.02 | 0.33 | 32.0 | 0.60 | 20.0 | | | 12.8 | 34.2 |
| Cokes | 150 | | | | | | | | | | | >85 | <15 |
| Total feed | 1500 | 0.05 | 3.78 | 1.92 | 19.0 | 15.3 | 6.32 | 6.00 | 1.79 | 4.72 | 0.01 | 9.71 | 31.3 |

Products of the process

| Component | Mass (kg) | Composition (wt. %) | | | | | | | | | | | |
|---|---|---|---|---|---|---|---|---|---|---|---|---|---|
| | | Ag | Pb | Cu | Zn | Fe | CaO | SiO$_2$ | MgO | S | Ge | C | Others |
| Fe-slag | 500 | 0.00 | 0.01 | 0.45 | 2.47 | 20.9 | 16.8 | 16.6 | 4.93 | 2.23 | <.001 | | 35.7 |
| Matte | 175 | 0.18 | 0.09 | 8.38 | 3.39 | 56.4 | 3.11 | 0.91 | 0.46 | 16.6 | .008 | | 10.4 |
| Fumes | 500 | 0.08 | 11.3 | 2.39 | 53.5 | 5.39 | 1.10 | 1.10 | 0.27 | 6.12 | .016 | | 18.8 |

Distribution (%)

| Component | Fraction (wt. %) | Ag | Pb | Cu | Zn | Fe | CaO | SiO$_2$ | MgO | S | Ge |
|---|---|---|---|---|---|---|---|---|---|---|---|
| Fe-slag | 33 | | | 8 | 4 | 48 | 88 | 92 | 92 | 10 | |
| Matte | 12 | 47 | | 51 | 2 | 43 | 6 | 2 | 3 | 35 | 15 |
| Fumes | 33 | 53 | 100 | 42 | 94 | 8 | 6 | 6 | 5 | 55 | 85 |

The slag analysis shows minimal amounts of leachable heavy metals, such as Pb, ensuring that the slag is environmentally clean. The high percentage of "Others" in the slag is attributable to oxygen bound to the metals.

The environmental stability of the slag was tested on the slag as such and after formation of concrete containing 30% slag and 10% cement. The tests were performed according to European norm NEN 7343, whereby the material is broken to less than 4 mm and percolated with acidified water. The leachability was assessed according to the Flemish VLAREA ("Vlaams reglement voor afvalvoorkoming en -beheer") norm for non-ferro metallurgical slags. The leachability of both the slag and the slag-containing concrete proved to be well below the limits applicable to products intended for the building industry.

The invented process thus achieves the separation of the metals as follows:

Zn, Pb and Ge in the fumes, which can be treated by known means for separation of Pb and Ge in different residues, and of Zn in a leach liquor;

Cu and precious metals in a matte or alloy, which can be refined using a classical Cu and precious metals flowsheet;

Fe in an inert, environmentally clean slag, reusable as e.g. gravel substitute in concrete.

The invention claimed is:

1. A single-chamber smelting and fuming reactor for treating Zn-bearing residues, said reactor being designed to contain a molten slag phase up to a determined level, said reactor comprising a plasma fired tuyere attached to a plasma torch as heat and gas source, said tuyere being arranged such that the torch and a connection point between the tuyere and the torch is under said level whereby the plasma is generated under said level.

2. A single-chamber smelting reactor according to claim 1, wherein the peripheral walls of the reactor are water-cooled.

3. The single-chamber smelting reactor of claim 1, wherein the plasma generated under said level induces bath agitation.

\* \* \* \* \*

UNITED STATES PATENT AND TRADEMARK OFFICE
CERTIFICATE OF CORRECTION

| | | |
|---|---|---|
| PATENT NO. | : 8,557,174 B2 | Page 1 of 1 |
| APPLICATION NO. | : 12/880693 | |
| DATED | : October 15, 2013 | |
| INVENTOR(S) | : Van Camp et al. | |

It is certified that error appears in the above-identified patent and that said Letters Patent is hereby corrected as shown below:

Title Page,
(62) Related U.S. Application Data, after "application No. 10/573,681,", replace "filed as application" with the following:

--filed March 23, 2006, which is a national stage application of International Application--.

Signed and Sealed this
Fourth Day of February, 2014

Michelle K. Lee
*Deputy Director of the United States Patent and Trademark Office*